June 24, 1969  J. B. ERIKSEN  3,451,191
DEVICE FOR USE IN CONNECTION WITH A FISH-CANNING MACHINE
Filed March 3, 1965
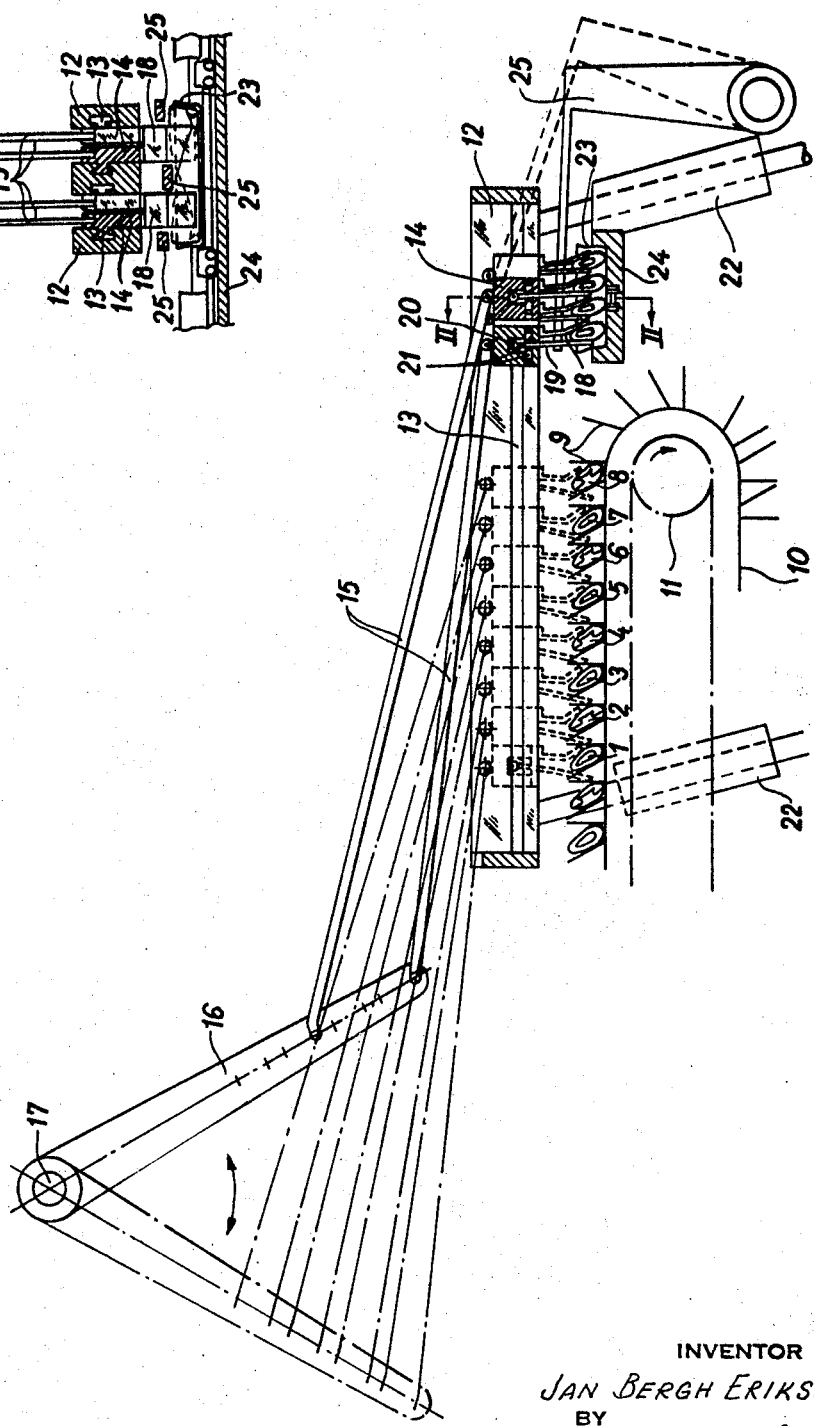
INVENTOR
JAN BERGH ERIKSEN
BY Young + Thompson
ATTORNEYS

United States Patent Office 3,451,191
Patented June 24, 1969

3,451,191
DEVICE FOR USE IN CONNECTION WITH A FISH-CANNING MACHINE
Jan Bergh Eriksen, Stavanger, Norway, assignor to Trio Fabrikker A/S De Forenede Norske Laase-Og Beslagfabriker, Stavanger, Norway
Filed Mar. 3, 1965, Ser. No. 436,795
Int. Cl. B65b 35/56
U.S. Cl. 53—142                                    4 Claims

ABSTRACT OF THE DISCLOSURE

Fish that lie alternately head and tail to each other along an endless belt conveyor are transferred to a can by means of a transfer device comprising three horizontal parallel interconnected rails, with several fish-gripping devices in tandem between one adjacent pair of rails and several more fish-gripping devices in tandem between the other pair of adjacent rails, the fish-gripping devices in the two rows being in staggered relationship with each other so that all of them pick up fish adjacent the fish's head. The rails are raised and lowered while the gripping devices are slid along them by links pivoted to a vertically swinging arm.

This invention relates to a device for use in connection with a fish-canning machine, the object being to transfer, with the help of gripping devices, fish from open cups to the can, the cups moving in a row in a direction at right angles to their longitudinal axes.

The aim of this invention is to furnish a device, simple yet accurate in operation, to transfer fish from a given position in open cups on a conveyor belt into the appropriate can in such a manner that the positions occupied by the fish relative to one another can be decided in advance.

This is achieved, according to the invention, by the device consisting of horizontal guide-rails which may be moved up and down, these guide-rails lying parallel to the direction of movement of the above-mentioned cups, and carrying two groups of gripping devices. These gripping devices may be moved along the rails by means of a corresponding number of push-pull levers, each lever being articulated at one end to a gripping device and at the other to one point or another along a common, swinging lever. This lever moves in a plane parallel to the pushpull levers in such a way that by coordinating the movements of the swinging lever and the guide-rails, the gripping devices in the one group pick up a fish in every other cup with the tail pointing in one direction, whilst the gripping devices in the other group pick up the fish in the other cups with their tails pointing in the opposite direction, the fish being lifted out of the cups and transferred into the can in such a manner that they lie head and tail to one another.

Preferably, the gripping device should consist of a holding component with a fixed member which, during the gripping operation, bears against the fish in the cup, and a hydraulically or pneumatically operated gripping member which is introduced through a slot in one of the side walls of the cup to bear against the other side of the fish.

A practical example of the invention will be explained below in more detail with reference to the drawing.

FIG. 1 shows, in diagram form, a side view, partly in section, of a device made according to the invention.

FIG. 2 shows a section cut along the line II—II on FIG. 1.

The device illustrated in FIG. 1 consists of a number of cups 9 open at the top, which are moved in a series in a direction at right angles to their longitudinal axes, the cups being fixed to an endless conveyor belt 10 which is driven by a wheel 11 in the direction indicated by the arrow. Every other cup 9 contains a fish 1,3,5,7 with the tail pointing in one direction, whilst the remaining cups 2,4,6,8 contain fishes whose tails point in the opposite direction. Above and parallel to the conveyor belt 10 there are three interconnected guide-rails 12 which, in their guide-tracks 13, carry gripping devices 14 which may be moved along the rails and which are articulated to push-pull levers 15, the other ends of these levers being connected to a common lever 16 which is arranged to swing to and fro about an axle 17. The gripping devices 14 are fitted underneath with a fixed gripping member 18 and a moving gripping member 19 which is arranged to be moved about an axle 20 with the help of a pneumatic piston 21. The guide-rail unit 12 is fittted on two lifting devices 22, the lifting movements of these being coordinated with the oscillations of the lever 16 and the operation of the pistons 21. When the gripping devices 14 occupy the position shown in FIG. 1 within full line, the guide-rail unit 12 is in its lowest position. In this position the gripping members 18 reach down into the cups between the walls and one side of the fishes, and the other gripping members 19 reach down through slots in the other side walls of the cups. By operating the one set of pistons (21 to the left in the drawing) fishes 1–8 are gripped. Thereupon, the guide-rail unit 12 is lifted up and the lever 16 swings to the right, moving the gripping devices 14 also to the right, whereupon the guide-rail unit 12 is lowered again to the position shown in full line on the drawing, depositing the fish in the can 23 on a conveyor track 24. On completion of this operation, the other piston 21 (to the right on the drawing) is operated loosening the hold of the gripping members on the fish, and a press-down lever 25 packs the fish into the can with their tails pointing in alternate directions, and keeps the fish in this position whilst the guide-rail unit 12 and thus the gripping members are lifted up and lever 16, swinging towards the left, brings the gripping devices 14 back to their initial positions, after which the guide-rail unit 12 is again lowered enabling the gripping members to pick up a new set of fish, whereupon the above described sequence of operations is repeated. As soon as the gripping members have been lifted up from the can 23, lever 25 is raised and the can 23 is removed whilst at the same time a fresh can is placed in position ready for filling.

By varying the number of devices 14 and gripping levers 15, the number of fish to be deposited in each can may be varied.

I claim:
1. A device for placing fish in a container, comprising a first conveyor having a plurality of pockets thereon for receiving fish that lie alternately head and tail to each other with the fish in each pocket oppositely disposed relative to the fish in each immediately adjacent pocket of the conveyor, a second conveyor transverse to the first conveyor for supporting said container, three parallel interconnected horizontal rails disposed above and parallel to the first conveyor, means for moving the rails bodily vertically, a plurality of grippers in tandem between each adjacent pair of said rails arranged in two groups of tandem grippers with the groups disposed side by side relative to each other and one said group between one pair of rails and the other group between the other pair of rails with the grippers of one group staggered with respect to the grippers of the other group, each said gripper comprising a fixed member and a member movable horizon- tally toward and away from said fixed member, means for moving the horizontally movable member of each said gripper toward and away from its associated fixed member to grasp a fish between said fixed and horizontally movable members and to release the same, and means for moving said grippers along the rails so that in a lowered position of the rails, the grippers may grasp fish on the first conveyor after which the rails may be raised and the grippers moved along the rails and then the rails may be lowered to place the gripped fish in a container on the second conveyor.

2. A device as claimed in claim 1, and a hold-down member that extends between said two groups of tandem grippers and below said rails to retain the fish in the container when the grippers rise away from the container.

3. A device as claimed in claim 2, and means mounting said hold-down member for vertical swinging movement about a horizontal axis.

4. A device as claimed in claim 1, and means mounting said horizontally movable member of each said gripper for vertical swinging movement about a horizontal axis toward and away from its associated said fixed member.

References Cited

UNITED STATES PATENTS

| 2,886,927 | 5/1959 | Fisk | 53—251 X |
| 3,047,990 | 8/1962 | Du Broff | 53—246 X |
| 3,191,357 | 6/1965 | Hawley et al. | 53—251 X |

FOREIGN PATENTS 101,382  2/1963  Norway.

TRAVIS S. McGEHEE, *Primary Examiner.*

U.S. Cl. X.R.

53—251